(12) United States Patent
Park et al.

(10) Patent No.: US 9,391,503 B2
(45) Date of Patent: Jul. 12, 2016

(54) CONVERTER CIRCUIT

(71) Applicant: ABB Oy, Helsinki (FI)

(72) Inventors: Ki-Bum Park, Fislisbach (CH); Sami Pettersson, Wettingen (CH); Francisco Canales, Baden-Dättwil (CH)

(73) Assignee: ABB OY, Helsinki (FI)

( * ) Notice: Subject to any disclaimer, the term of this patent is extended or adjusted under 35 U.S.C. 154(b) by 100 days.

(21) Appl. No.: 14/508,467

(22) Filed: Oct. 7, 2014

(65) Prior Publication Data

US 2015/0098258 A1 Apr. 9, 2015

(30) Foreign Application Priority Data

Oct. 7, 2013 (EP) .................................... 13187505

(51) Int. Cl.
*H02M 5/45* (2006.01)
*H02M 1/32* (2007.01)
*H02H 7/12* (2006.01)
(Continued)

(52) U.S. Cl.
CPC .............. *H02M 1/32* (2013.01); *H02H 7/1216* (2013.01); *H02H 7/1225* (2013.01); *H02H 7/1255* (2013.01); *H02M 5/42* (2013.01); *H02M 5/4585* (2013.01)

(58) Field of Classification Search
CPC .... H02M 5/4585; H02M 1/32; H02H 7/1255; H02H 7/1216; H02H 7/1225
USPC .......................................................... 363/37
See application file for complete search history.

(56) References Cited

U.S. PATENT DOCUMENTS 8,295,067 B2 * 10/2012 Grbovic .................. H02M 1/08
363/37
2007/0249461 A1 10/2007 Tsuji et al.
(Continued)

FOREIGN PATENT DOCUMENTS

DE 10 2006 029 928 B3 9/2007
FR 2 943 474 A1 3/2009

OTHER PUBLICATIONS

European Search Report issued Mar. 6, 2014, by the European Patent Office in corresponding European Patent Application No. 13 18 7505, (2 Pages).
(Continued)

*Primary Examiner* — Adolf Berhane
*Assistant Examiner* — Afework Demisse
(74) *Attorney, Agent, or Firm* — Buchanan Ingersoll & Rooney PC

(57) ABSTRACT

A converter circuit with short-circuit protection can include a plurality of phase legs having a series connection of normally-on switches, between voltage rails of a DC voltage link, a DC link capacitor, and AC voltage connection points between the normally-on switches. A phase-to-phase short-circuit protection circuit includes a parallel connection of a resistive component and a controllable switch. The phase-to-phase short-circuit protection circuit including a first terminal connected to an AC voltage connection point and a second terminal forms an input or an output of the converter circuit; and a controllable switch is connected in series with the DC link capacitor. Upon lack of control of the normally-on switches the controllable switch of the at least one phase-to-phase short-circuit protection circuit and the controllable switch of the phase leg short-circuit protection circuit are adapted to be controlled to a non-conductive state.

19 Claims, 4 Drawing Sheets

(51) Int. Cl.
*H02H 7/122* (2006.01)
*H02H 7/125* (2006.01)
*H02M 5/42* (2006.01)
*H02M 5/458* (2006.01)

(56) References Cited

U.S. PATENT DOCUMENTS

2010/0295523 A1 11/2010 Grbovic
2012/0105131 A1 5/2012 Biela et al.

OTHER PUBLICATIONS

Lai et al., "A Shoot-Through Protection Scheme for Converters Built with SiC JFETs", Energy Conversion Congress and Exposition, IEEE, Sep. 20, 2009, XP031887905, pp. 2301-2305.

Falahi et al., "Integrated Anti-Short-Circuit Safety Circuit in CMOS SOI for Normally-On JFET", Integrated Power Electronics Systems, 7$^{th}$ International Conference, Mar. 6-8, 2012, XP032181431, pp. 1-5.
Round et al., "A SiC JFET Driver for a 5 kW, 150 kHz Three-Phase PWM Converter," IAS Annual Meeting, IEEE, 2005, pp. 410-416.
Bergogne et al., "Normally-On SiC JFETs in Power Converters: Gate Driver and Safe Operation", CIPS, Mar. 16-18, 2010. (6 Pages).
Application Note AN-SS7-SSJHB12R085-1 Half-Bridge Demo Board User's Guide, SemiSouth. pp. 1-20.
Siemieniec et al., "Stability and performance analysis of a SiC-based cascode switch and an alternative solution". (23 Pages).
Domes et al., "1st industrialized 1200 V SiC JFET module for high energy efficiency applications", PCIM Europe 2011, pp. 567-572.
Dubois et al, "Active protections for Normally-On SiC JFETs," in Proc. EPE 2011. (10 Pages).

\* cited by examiner

CONVERTER CIRCUIT

RELATED APPLICATION

This application claims priority under 35 U.S.C. §119 to European Patent Application No. 13187505.6 filed in Europe on Oct. 7, 2014, the entire content of which is hereby incorporated by reference in its entirety.

FIELD

The present invention relates to a converter circuit, such as to a converter circuit employing normally-on type switches.

BACKGROUND INFORMATION

SiC (silicon carbide) power semiconductor devices are promising for high voltage, high frequency and high temperature operation, thus enabling higher efficiency and higher power density designs. Among the currently available SiC active switches, the normally-on type (N-on) JFET is the most mature device. However, it has certain features which make its use more challenging compared to standard normally-off type devices [1],[2]. For the operation of N-on JFET components a negative voltage must be applied to turn off the switch and to keep the switch in a blocking state. Further, due to the normally-on characteristic, the switch or a circuit employing the switch requires additional protection circuits and startup circuits.

Startup and protection are exemplary issues which are considered to prevent a short-circuit fault condition when the gate control signal is lost or the auxiliary power supply (APS) is not operating. Auxiliary power supply is used for generating voltages required for controlling the component. In a component that is of a normally-on type, the loss of auxiliary power means that the component is turned on. Similarly, in a startup operation a circuit having normally-on switches may be powered before the auxiliary power supply is able to produce voltages for the control circuit. This may lead to a situation in which current passes through normally-on switches in an uncontrolled manner.

FIG. 1 shows an exemplary back-to-back converter structure based on N-on type JFETs as an example. In FIG. 1, both a startup operation and an auxiliary power supply fault condition are considered.

If the N-on JFETs were used without any additional protection scheme, two possible short-circuit paths are possible, as shown in FIG. 1. A phase-to-phase short-circuit is presented in FIG. 1 both on a grid side and on a motor side. In the phase-to-phase short-circuit, the input phases from the grid are short-circuited as a current path is formed between the phases through the conducting switches. For example, it is shown that the current from the supplying grid passes through switches JL1 and JL2 such that these switches connect different phases directly together.

FIG. 1 also shows a motor side short-circuit that is formed similarly as the grid side short-circuit. The motor side short-circuit connects two motor phases through switches that are conducting.

In a phase leg short-circuit the DC link capacitor is short-circuited through a series connection of switch components. In normal operation the series connected switches should not be controlled conductive at the same time. Once control of the components is missing, the DC link capacitor is short-circuited, causing excessive current in the short-circuit path.

In order to prevent these fault conditions, a cascode structure utilizing a low-voltage MOSFET is a popular protection method, which makes the N-on JFET behave as a normally-off type (N-off) switch [3]-[7]. Therefore, during a fault condition, the converter acts exactly as a diode rectifier when all the gate signals are off. FIG. 2 shows an N-on JFET-based converter employing a direct-driven cascode structure with a startup circuit, i.e. $R_{S-up}$ and $S_{S-up}$. Although this configuration is promising in terms of protection and startup, the total number of components is very large due to the additional MOSFETs and their gate drivers.

FIG. 2 shows combined driver circuits for both N-on JFET (GDJ) and MOSFETs (GDM). The operation of such a combined driver is such that when auxiliary power is available, the MOSFET is controlled conductive and normal switching operations are carried out with the N-on JFET. Should the auxiliary power from the N-on JFET disappear, the MOSFET is able to control the N-on JFET into a blocking state. Further, if the auxiliary power from the MOSFET disappears, both components are controlled automatically to a blocking state and thereby the short-circuit paths are eliminated.

Reference [8] proposes a simple startup circuit for a grid side converter. The startup circuit turns off the switches automatically at startup by utilizing the voltage of an auxiliary rectifier. However, the auxiliary rectifier is directly connected to the gate driver, which affects the gate driver design and performance. Moreover, the resistance connected between the auxiliary rectifier and the gate drivers may cause extra power losses during normal operation.

To protect the motor side converter, an additional switch has been inserted in the negative rail in [9]. This can prevent short-circuits in phase legs, but the motor side short-circuit is not considered. In [10], a self-protection circuit which monitors the gate-source voltage of the JFET is proposed. However, the additional high voltage linear regulator to provide the negative voltage increases the total circuit complexity.

SUMMARY

A converter circuit is disclosed with short-circuit protection, comprising: a plurality of phase legs having a series connection of normally-on switches, the phase legs being connected between positive and negative voltage rails of a DC voltage link; a DC link capacitor; AC voltage connection points formed of connection points between the normally-on switches; at least one phase-to-phase short-circuit protection circuit having a parallel connection of a resistive component and a controllable switch, the phase-to-phase short-circuit protection circuit including first and second terminals, the first terminal being connected to an AC voltage connection point and the second terminal forming an input or an output of the converter circuit; and a phase leg short-circuit protection circuit having a controllable switch connected in series with the DC link capacitor, the series connection of the controllable switch and the DC link capacitor being connected between the positive and negative voltage rails of the DC voltage link; wherein in case of lack of control of the normally-on switches, the converter circuit is configured so that the controllable switch of the at least one phase-to-phase short-circuit protection circuit and the controllable switch of the phase leg short-circuit protection circuit will be controlled to a non-conductive state.

BRIEF DESCRIPTION OF THE INVENTION

In the following the invention, features will be described in greater detail by way of exemplary embodiments with reference to the attached drawings, in which.

DETAILED DESCRIPTION

Exemplary converter circuits are disclosed which can address the foregoing issues.

For example, exemplary embodiments include a parallel connection of a controllable switch and a resistive component at the input and/or output of a converter circuit, and another controllable switch in series with a DC link capacitor. In case of loss of auxiliary power supply, the controllable switches are opened to block the possible short-circuit paths.

According to an exemplary embodiment, the converter circuit can include a start-up circuit which provides a path for charging the DC link capacitor and thereby also for the auxiliary power supply used for powering the driver circuits needed for the operation of the normally-on components.

In another embodiment, the converter circuit can include a normally-off-type gate driver for normally-on switch components. Such a gate driver is capable of maintaining driving ability for keeping the normally-on switches in an off-state for a certain time period after the loss of power of the auxiliary power supply. This capability can be used for allowing time for the short-circuit protection circuits to open.

An exemplary advantage of circuits disclosed herein is that the number of components can be greatly reduced while maintaining safe operation using low-loss normally-on type components.

Figure 1:
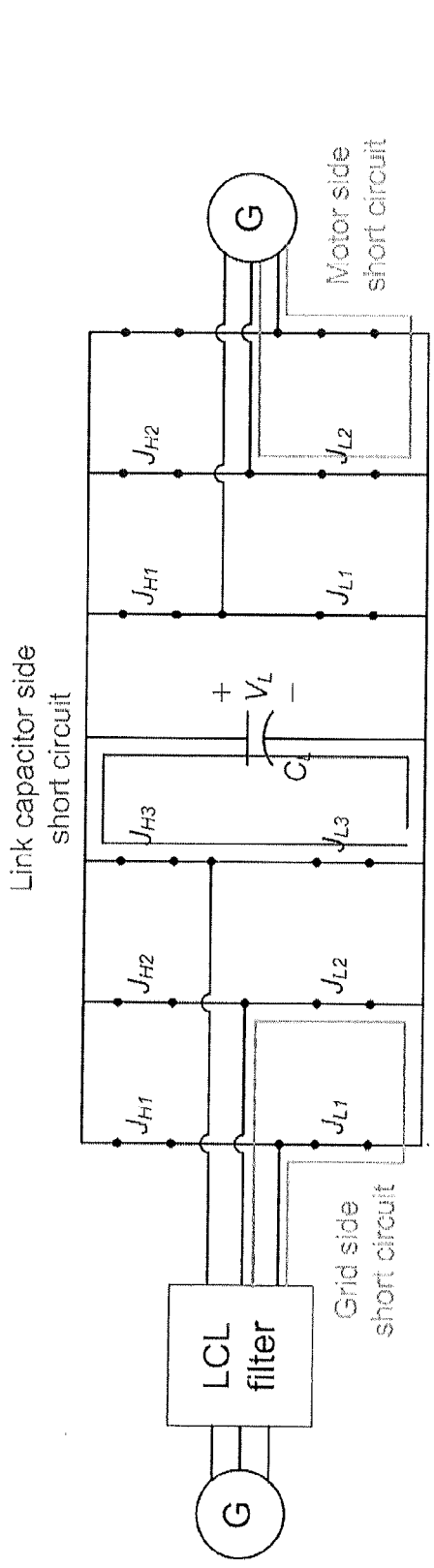
FIG. 1 shows short-circuit paths of an exemplary N-on JFET-based converter.
Figure 2:
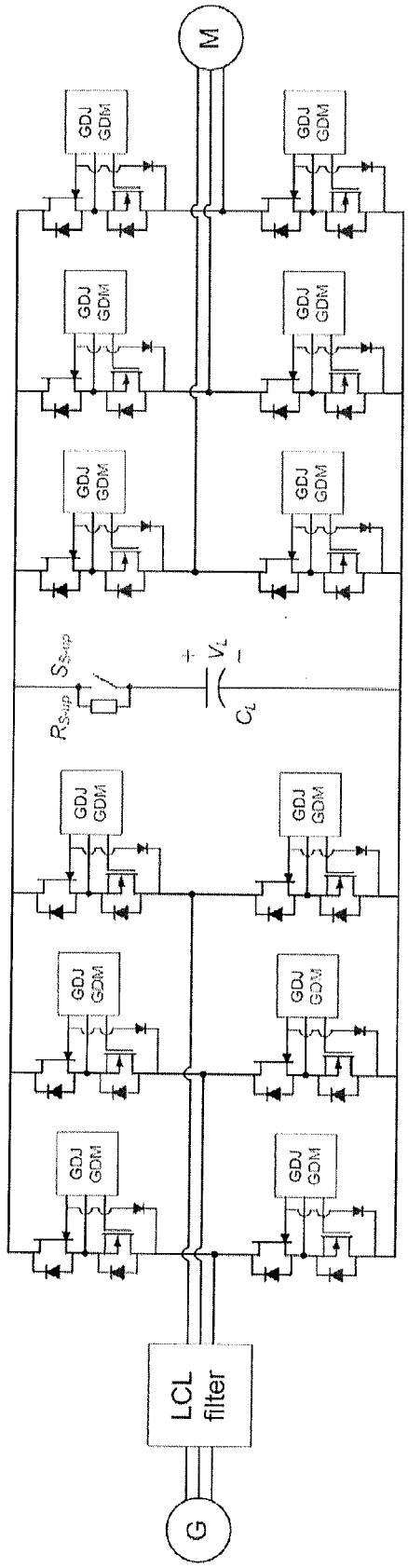
FIG. 2 shows an exemplary N-on JFET-based converter with a direct-driven cascode structure.
Figure 3:
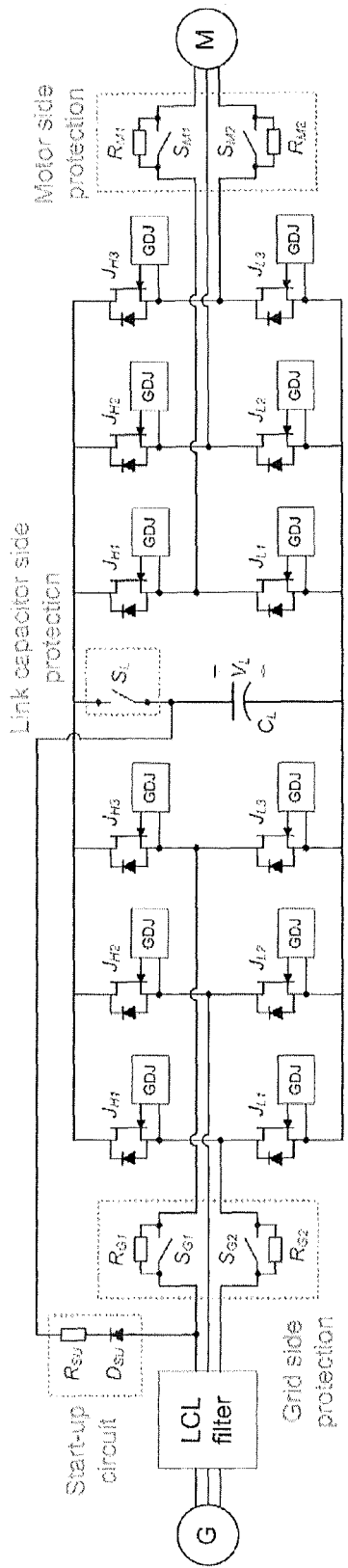
FIG. 3 shows an exemplary N-on JFET-based converter according to an exemplary embodiment disclosed herein.

FIG. 3 shows an exemplary embodiment disclosed herein. A converter circuit presented in FIG. 3 is a frequency converter having an input bridge (controlled rectifier) and an output bridge (inverter). The circuit structures of the controlled rectifier and the inverter are similar and therefore the controlled switches of the bridges are denoted with the same symbols $J_{H1}$, $J_{H2}$, $J_{H3}$, $J_{L1}$, $J_{L2}$, $J_{L3}$. Further, each controlled switch is connected to a gate driver circuit denoted as GDJ.

According to an exemplary embodiment, a converter circuit with short-circuit protection comprises multiple phase legs having a series connection of normally-on switches. The series connections of normally-on switches are formed with switches $J_{H1}$, $J_{L1}$; $J_{H2}$, $J_{L2}$ and $J_{H3}$, $J_{L3}$. These phase legs are connected between positive and negative voltage rails of a DC voltage link in a typical manner. The converter circuit can include a DC link capacitor $C_L$, and AC voltage connection points are formed of the connection points between the normally-on switches. The AC voltage connection points are the phase outputs or phase inputs. When the converter circuit is a controlled rectifier, the AC voltage connection points are the points to which the input AC voltage is connected. FIG. 3 shows that the AC voltage connection points of the controller rectifier are connected to the grid G through an LCL filter and grid side protection. Correspondingly, the AC voltage connection points of the inverter are connected to a motor M through motor side protection.

The converter circuit can include at least one phase-to-phase short-circuit protection circuit. The phase-to-phase short-circuit protection circuit includes a parallel connection of a resistive component $R_{G1}$, $R_{G2}$, $R_{M1}$, $R_{M2}$ and a controllable switch $S_{G1}$, $S_{G2}$, $S_{M1}$, $S_{M2}$. FIG. 3 shows three phase-to-phase short-circuit protection circuits that are formed of parallel connections of resistance $R_{G1}$ and switch $S_{G1}$, resistance $R_{G2}$ and switch $S_{G2}$, resistance $R_{M1}$ and switch $S_{M1}$, and resistance $R_{M2}$ and switch $S_{M2}$. In the parallel connections the switch can be operated to short-circuit the resistance.

The phase-to-phase short-circuit protection circuit has first and second terminals. The first terminal is connected to an AC voltage connection (e.g., to the center point between the series connection of switches). The second terminal of the phase-to-phase short-circuit protection circuit forms an input or an output of the converter circuit. When the converter is a controlled rectifier, an input of the converter circuit is formed. In FIG. 3 the controlled rectifier can include two phase-to-phase short-circuit protection circuits. The ends connected to the LCL-filter form the input of the converter. As the controlled rectifier is a three-phase rectifier, one input to the controlled rectifier is without a protection circuit. Similarly, in connection with the output bridge of the converter of FIG. 3, two outputs are formed of second terminals of the phase-to-phase short-circuit protection circuits.

Exemplary embodiments can include a phase leg short-circuit protection circuit that includes a controllable switch $S_L$ in series with the DC link capacitor $C_L$. The series connection of the switch and the capacitor is connected between the positive and negative voltage rails of the DC voltage link. The controllable switch is able to open and close and therefore separate the DC link capacitor from the DC link when the controllable switch $S_L$ is operated.

In exemplary embodiments, in case of lack of control of the normally-on switches, such as normally-on JFETs, the controllable switch of the at least one phase-to-phase short-circuit protection circuit and the controllable switch of the phase leg short-circuit protection circuit are operated so that they are controlled to a non-conductive state.

An exemplary circuit as disclosed herein can be controlled such that when the auxiliary power supply that is used for controlling the normally-on switches is lost, the controllable switches of phase-to-phase short-circuit protection circuits and the phase leg short-circuit protection circuit are opened. The opening of the switches cut the possible short-circuit paths and even if the normally-on components turn conductive, no harmful short-circuit current can pass.

In a normal operation mode when auxiliary power for the normally-on JFETs is available, the controllable switches of the protection circuits are conductive. In other words, switches $S_{G1}$, $S_{G2}$, $S_{M1}$, $S_{M2}$ and $S_L$ of the example of FIG. 3 are conducting. If the auxiliary power that is used for controlling the normally-on switches disappears, the protection switches $S_{G1}$, $S_{G2}$, $S_{M1}$, $S_{M2}$ and $S_L$ are opened. When the phase-to-phase short-circuit protection switches $S_{G1}$, $S_{G2}$, $S_{M1}$ and $S_{M2}$ are opened, a sufficiently large resistance is put in the short-circuit path and the short-circuit current is limited to tolerable limits. When the controllable switch of the phase leg short-circuit protection circuit is opened, the short-circuit path through the series connection of the switches from the DC link capacitor $C_L$ is completely blocked.

According to an exemplary embodiment, the converter can include a charging circuit for charging the DC link capacitor. The charging circuit can include a series connection of a diode $D_{SU}$ and a resistive component $R_{SU}$. The charging circuit is connected between the second terminal of the phase-to-phase short-circuit protection circuit forming an input of the converter circuit and the connection point between the phase leg short-circuit protection circuit and the DC link capacitor.

The connection of the start-up or charging circuit is shown also in FIG. 3. The series connection of the diode $D_{SU}$ and the resistive component $R_{SU}$ is connected such that the current can pass from the grid side to the DC link. Further, the series connection is connected to the supplying network to a phase provided with the grid side protection circuit. In the example of FIG. 3 the charging circuit is connected to the phase having resistor $R_{G1}$ and switch $S_{S1}$. In the DC link side, the connection is made between the controllable switch $S_L$ and the capacitor $C_L$.

Figure 4:
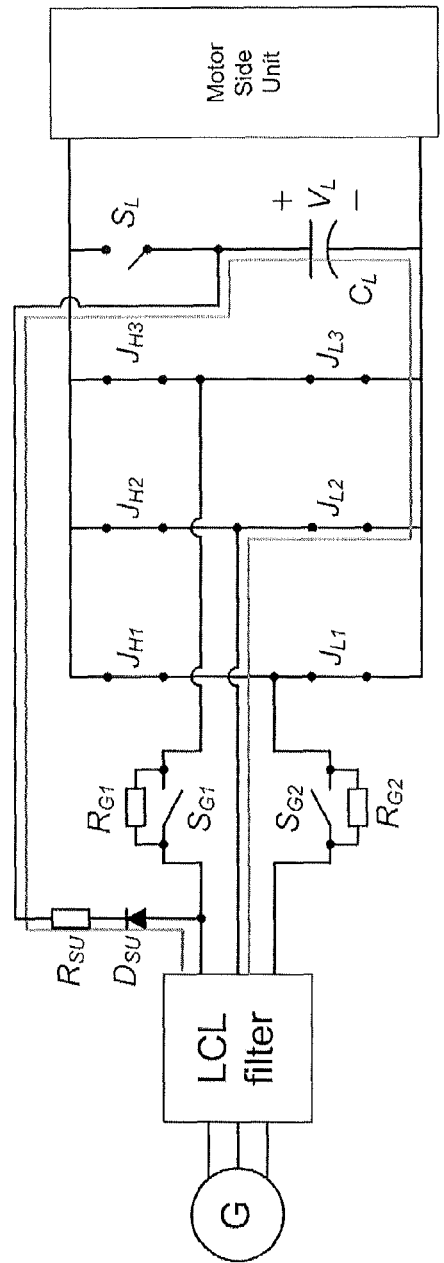
FIG. 4 illustrates an exemplary startup operation in a converter according to an exemplary embodiment.

When all protection switches are in an off-state, there is neither a short-circuit path nor a charging path for $C_L$. Therefore, an additional charging path is added. During startup, the charging current of $C_L$ flows through the additional startup circuit formed by $D_{su}$, and $R_{su}$, as shown in FIG. 4. The charging current that enables the start-up of the converter runs via the startup or charging circuit through the DC link capacitor $C_L$ and to another input phase through switch $J_{L2}$. The charging of the capacitor $C_L$ is possible as the input phase having switches $J_{L2}$ and $J_{H2}$ does not have a short-circuit protection circuit.

When the DC link capacitor has been charged for a while, the auxiliary power supply providing power to the gate driver can be taken in use. The auxiliary power supply is for example connected to the DC link for obtaining power from the DC link. After the auxiliary power supply starts operating and is able to provide power for the gate drivers, all the protection switches will be turned on and the normal operation of the converter may begin.

Figure 5:
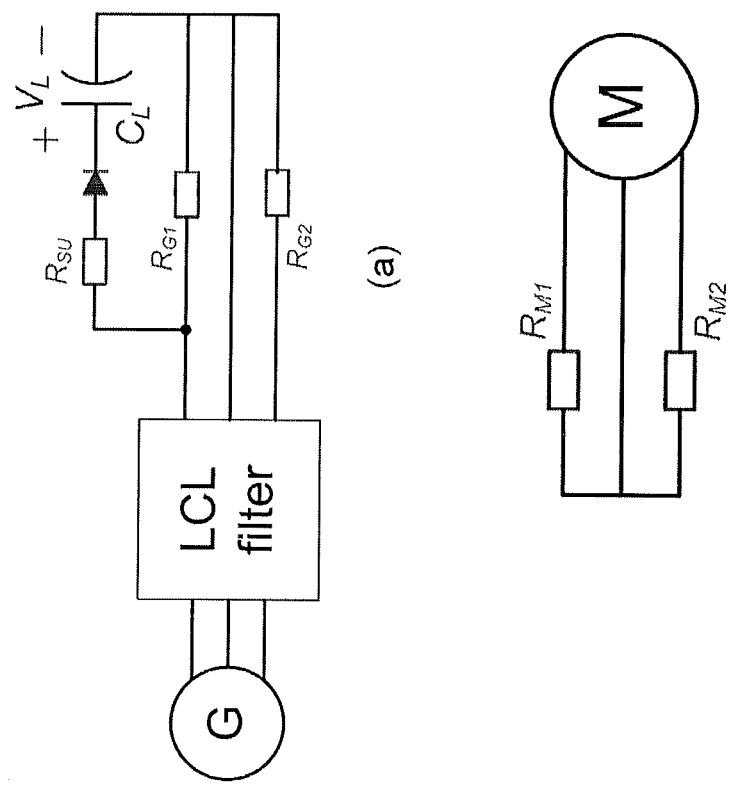
FIG. 5 shows an exemplary equivalent circuit for phase-to-phase short-circuit protection (a) for the grid side and (b) for the motor side.

FIG. 5 shows equivalent circuits for phase-to-phase short-circuit protection for both (a) the grid side and (b) the motor side of the structure of FIG. 3 when the protection switches are open. In case a fault occurs during converter operation and all the JFETs lose their gate control signals, a large phase current will be generated by the grid voltage along the short-circuit path. This fault current is determined by the magnitude of the grid voltage and the impedance of the LCL filter, if one is present.

In order to reduce this inductive current to avoid a hazard, an additional large impedance is inserted in series with the LCL filter. In this case, the high impedance is provided by the resistances $R_{G1}$ and $R_{G2}$ when the protection switches $S_{G1}$ and $S_{G2}$ are open. Only two resistors are used to effectively limit all the phase currents in the example of FIG. 3. One protection switch $S_L$ in series with $C_L$ prevents phase leg short-circuits for both the grid side and the motor side converters.

FIG. 3 shows a converter structure having an input bridge and an output bridge. Both of these bridges form a converter by themselves (e.g., the input bridge of FIG. 3 is a controlled rectifier and the output bridge is an inverter). Exemplary embodiments disclosed herein are applicable to converter structures other than those shown in the example of FIG. 3. As is clear from the above description, exemplary embodiments can be applicable to a converter structure having a DC link and phase outputs or phase inputs formed of a series connection of normally-on type switches.

FIG. 3 shows an exemplary embodiment in which both the input bridge and the output bridge are three-phase converters. However, exemplary embodiments can be applied to single phase systems having two phase legs. Two phase legs means that two series connections of normally-on type switches are connected between the DC link. In case of two phase legs, only one phase-to-phase short-circuit protection circuit is used. The protection circuit is connected similarly as in connection with the three-phase converter of FIG. 3, and the phase-leg short-circuit protection circuit is as shown in FIG. 3.

In a single phase converter the startup or charging circuit is connected similarly as in FIG. 3. In other words, the series connection of a diode and a resistor is connected to the input phase having a short-circuit protection circuit so that the charging current is able to flow.

For keeping the conduction losses at the minimum, the protection switches in the protection circuits are for example, mechanical switches. However, the switching speed of mechanical switches can be considered very slow compared to that of solid-state switches. For example, a switching event lasts about tens of milliseconds. For preventing an immediate short-circuit when a fault occurs, the normally-on JFETs need to remain in an off-state for some time so that the protection switches are completely open.

Figure 6:
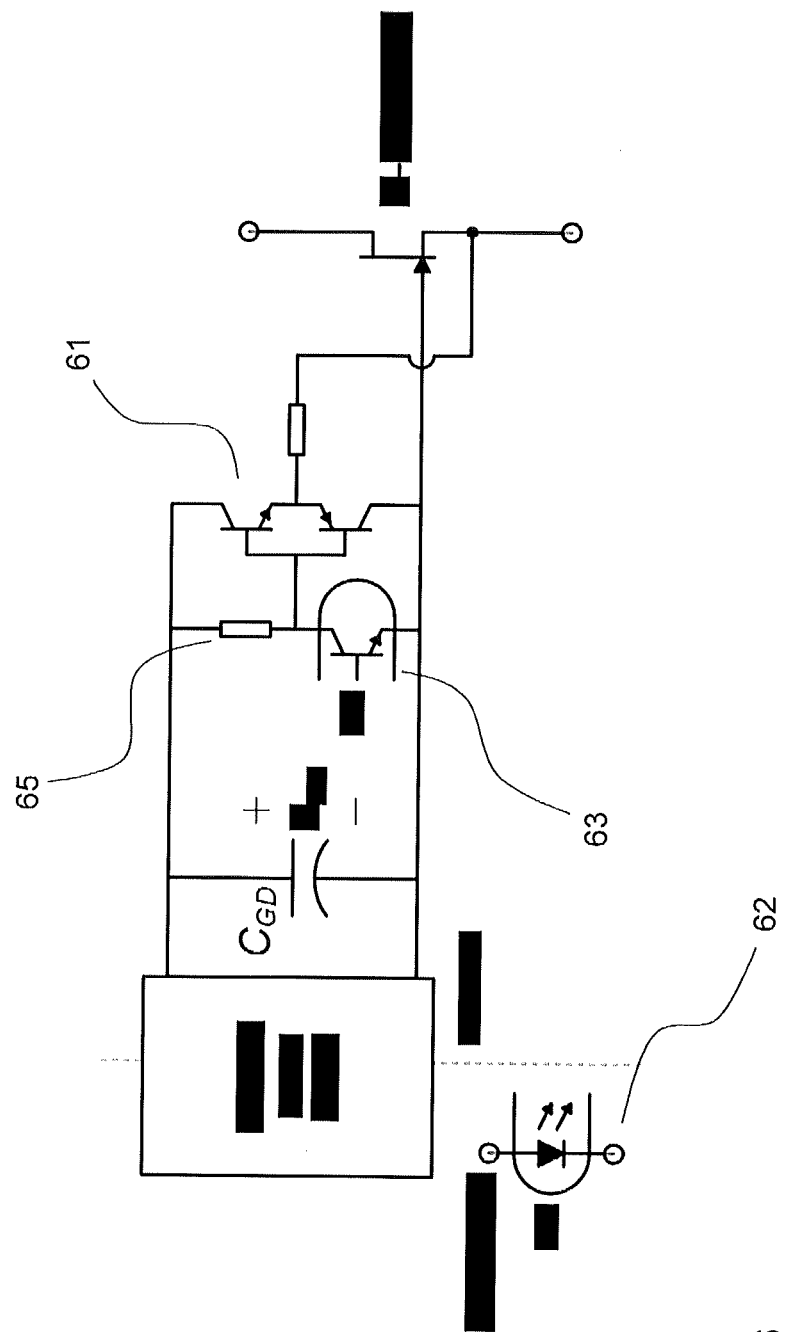
FIG. 6 shows an exemplary normally-off-type gate driver for normally-on-type JFET.

FIG. 6 shows a normally-off type gate driver for a normally-on type JFET according to an exemplary embodiment. The gate driver of FIG. 6 is powered by auxiliary power supply that provides a voltage that is suitable for driving the JFET. The normally-on JFET is controlled using an optocoupler OC. The diode 62 of such an optocoupler produces light according to the gate signal. The light is received by the transistor part 63 of the optocoupler and the JFET is controlled according to the gate signal. The optocoupler and the auxiliary power supply form an isolation barrier between the voltage levels in the converter. The auxiliary power supply may be for example a power supply of a flyback type which has a transformer for isolation and which generates the appropriate voltage level from the DC link voltage.

When the normally-on JFET component is controlled conductive with the pulse from the optocoupler, the input to the push-pull transistor pair 61 is drawn to the negative auxiliary potential. As the input to the push-pull circuit 61 is low, the lower transistor conducts and the source of the JFET is connected to the same potential with the gate, and thereby the JFET is conducting. When the gate signal is OFF and the signal from the optocoupler is missing, the input to the transistor pair is drawn to the positive auxiliary voltage through resistor 65, and the upper transistor of the transistor pair is conductive. When the upper transistor conducts, the source of the JFET is set to a higher potential with respect to the gate, and therefore the JFET blocks.

In a case where the control signal to the normally-on JFET switch is lost, the normally-off type gate driver of FIG. 6 turns off the normally-on JFET switch as the gate driver pulls the source up to the positive auxiliary voltage, as described above. If the voltage from the auxiliary power supply is lost, then the normally-on JFET turns on and starts conducting. For preventing immediate turn-on of the switches once the auxiliary voltage is lost, in the embodiment of FIG. 6 a capacitor $C_{GD}$ is connected to the output of the auxiliary power supply. The capacitor $C_{GD}$ is connected between the positive and the negative auxiliary voltages for maintaining the output voltage of the auxiliary power supply for a time period in case the auxiliary power supply cannot keep producing the voltage to the gate driver. In other words, if the auxiliary power supply is not able to produce the needed voltage, the capacitor $C_{GD}$ maintains the voltage level for a time period so that the normally-on type switches can be controlled.

With the gate driver circuit of the embodiment in use, when the gate control signal is lost, the gate driver circuit turns the component to the off-state. On the other hand, when the auxiliary power supply is not able to produce an auxiliary voltage, the capacitor $C_{GD}$ maintains the voltage level enabling the control of the controlled normally-on-type JFET switch. The time period for sustaining the auxiliary voltage with the capacitor can be set by selecting the capacitance of the capacitor. The gate-source leakage current of a normally-ON JFET drains current from the capacitor and the voltage of the capacitor decreases slowly. Once the voltage decreases below a certain threshold limit, the normally-ON JFET is not able to stay in the blocking state. During this time period the protection switches of the protective circuits are opened for blocking and limiting the short-circuit current. Thus, even protection switches that are mechanical switches limiting conduction losses can be operated in a timely manner due to the above described sustained operation of the gate drivers.

In FIG. 6 the capacitor $C_{GD}$ is shown to be situated at the output of the auxiliary power supply. However, each gate driver circuit may include its own capacitor situated at the input to the gate driver circuit. An exemplary converter system can include a single auxiliary power supply that feeds power to each of the gate driver circuits. Alternatively, a single and somewhat larger capacitor is provided for sustaining the voltage for all of the gate driver circuits.

For the operation of the protective circuits, a signal indicating the loss of auxiliary voltage production is generated from a circuit that monitors the operation of the auxiliary power supply. Once the control circuitry receives such a signal, it controls the short-circuit protection circuits of the invention to open the switches for eliminating short-circuit paths.

In the above, exemplary embodiments are mainly described in connection with a converter shown in FIG. 3. The converter of FIG. 3 is a frequency converter that is able to provide a controlled three-phase voltage to the output from an input three-phase voltage. The frequency converter of FIG. 3 includes two converters, each of them alone constituting exemplary embodiments disclosed herein. Further, the LCL filter shown in the input of the converter of FIG. 3 is an optional feature and is not required for the disclosed embodiments.

It will be apparent to those skilled in the art that, as the technology advances, the inventive concept can be implemented in various ways. The invention and its embodiments are not limited to the examples described above but may vary within the scope of the claims.

Therefore, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCES

[1] S. Round et al, "A SiC JFET driver for a 5 kW, 150 kHz three-phase sinusoidal-input, sinusoidal-output PWM converter," *IAS annual meeting*, 2005.
[2] D. Bergogne et al, "Normally-on SiC JFETs in power converters: gate driver and safe operation," CIPS 2010.
[3] AN-SS7-SSJHB12R085-1 Half-bridge demo board user's guide, Semisouth.
[4] US20120105131 A1, 3 May 2012, Switching device with a cascode circuit.
[5] R. Siemieniec, G. Nobauer, and D. Domes, "Stability and performance analysis of a SiC-based cascode switch and an alternative solution,"
[6] DE102006029928 B3, 6 Sep. 2007, Electronic switching device for switching high electric current, has isolating unit connected between control connection of switching unit and load supply of another switching unit, where isolation unit decouples switching units.
[7] D. Domes, C. Messelke, and P. Kanschat, "1st industrialized 1200 V SiC JFET module for high energy efficiency applications," *PCIM Europe* 2011, pp. 567-572.
[8] US20100295523 A1, 25 Nov. 2010, Power converter using a rectifier with normally on transistors.
[9] FR2943474 B1, 6 May 2011, Power converter for variable speed drive, has normally open type auxiliary switch positioned in series with each switching arm and connected on negative line of power supply bus, and control device controlling each auxiliary switch.
[10] F. Dubois et al, "Active protections for normally-on SiC JFETs," in *Proc. EPE* 2011.

The invention claimed is:

1. A converter circuit with short-circuit protection, comprising:
   a plurality of phase legs having a series connection of normally-on switches, the phase legs being connected between positive and negative voltage rails of a DC voltage link;
   a DC link capacitor;
   AC voltage connection points formed of connection points between the normally-on switches;
   at least one phase-to-phase short-circuit protection circuit having a parallel connection of a resistive component and a controllable switch, the phase-to-phase short-circuit protection circuit including first and second terminals, the first terminal being connected to an AC voltage connection point and the second terminal forming an input or an output of the converter circuit; and
   a phase leg short-circuit protection circuit having a controllable switch connected in series with the DC link capacitor, the series connection of the controllable switch and the DC link capacitor being connected between the positive and negative voltage rails of the DC voltage link;
   wherein in case of lack of control of the normally-on switches, the converter circuit is configured so that the controllable switch of the at least one phase-to-phase short-circuit protection circuit and the controllable switch of the phase leg short-circuit protection circuit will be controlled to a non-conductive state.

2. A converter circuit according to claim 1, wherein the converter circuit is a single phase converter circuit having two phase legs, wherein the converter circuit comprises:
   one phase-to-phase short-circuit protection circuit.

3. A converter circuit according to claim 1, wherein the converter circuit is a three phase converter circuit having three phase legs wherein the converter circuit comprises:
   two phase-to-phase short-circuit protection circuits.

4. A converter circuit according to claim 1, wherein the converter circuit is an AC to AC converter comprising:
   input phase legs forming a controllable rectifier and output phase legs forming an inverter, wherein the DC link is common to the controllable rectifier and the inverter and at least one phase-to-phase short-circuit protection circuit is arranged both in the controllable rectifier and in the inverter, and wherein the phase leg short-circuit protection circuit is arranged in the common DC link.

5. A converter circuit according to claim 1, comprising:
a charging circuit for charging the DC link capacitor, the charging circuit having a series connection of a diode and a resistive component, the charging circuit being connected between the second terminal of the phase-to-phase short-circuit protection circuit forming an input of the converter circuit and the connection point between the phase leg short-circuit protection circuit and the DC link capacitor.

6. A converter circuit according to claim 1, comprising:
one or more of the controllable switches of the short-circuit protection circuits are mechanical switches.

7. A converter circuit according to claim 1, comprising:
an auxiliary power supply and one or more gate driver circuits for driving the normally-on switches of the converter circuit, the gate driver circuits receiving voltage from the auxiliary power supply, wherein the gate driver circuits are normally-off type circuits that are provided with a capacitor for sustaining the voltage from the auxiliary power supply.

8. A converter circuit according to claim 7, wherein the capacitor is configured to sustain voltage from the auxiliary power supply for enabling the switches of the short-circuit protection circuit to be controlled to an off-state.

9. A converter circuit according to claim 1, wherein the normally-on switches are normally-on JFETs.

10. A converter circuit according to claim 2, wherein the converter circuit is an AC to AC converter comprising:
input phase legs forming a controllable rectifier and output phase legs forming an inverter, wherein the DC link is common to the controllable rectifier and the inverter and at least one phase-to-phase short-circuit protection circuit is arranged both in the controllable rectifier and in the inverter, and wherein the phase leg short-circuit protection circuit is arranged in the common DC link.

11. A converter circuit according to claim 3, wherein the converter circuit is an AC to AC converter comprising:
input phase legs forming a controllable rectifier and output phase legs forming an inverter, wherein the DC link is common to the controllable rectifier and the inverter and at least one phase-to-phase short-circuit protection circuit is arranged both in the controllable rectifier and in the inverter, and wherein the phase leg short-circuit protection circuit is arranged in the common DC link.

12. A converter circuit according to claim 10, comprising:
a charging circuit for charging the DC link capacitor, the charging circuit having a series connection of a diode and a resistive component, the charging circuit being connected between the second terminal of the phase-to-phase short-circuit protection circuit forming an input of the converter circuit and the connection point between the phase leg short-circuit protection circuit and the DC link capacitor.

13. A converter circuit according to claim 11, comprising:
a charging circuit for charging the DC link capacitor, the charging circuit having a series connection of a diode and a resistive component, the charging circuit being connected between the second terminal of the phase-to-phase short-circuit protection circuit forming an input of the converter circuit and the connection point between the phase leg short-circuit protection circuit and the DC link capacitor.

14. A converter circuit according to claim 12, comprising:
one or more of the controllable switches of the short-circuit protection circuits are mechanical switches.

15. A converter circuit according to claim 13, comprising:
one or more of the controllable switches of the short-circuit protection circuits are mechanical switches.

16. A converter circuit according to claim 14, comprising:
an auxiliary power supply and one or more gate driver circuits for driving the normally-on switches of the converter circuit, the gate driver circuits receiving voltage from the auxiliary power supply, wherein the gate driver circuits are normally-off type circuits that are provided with a capacitor for sustaining the voltage from the auxiliary power supply.

17. A converter circuit according to claim 15, comprising:
an auxiliary power supply and one or more gate driver circuits for driving the normally-on switches of the converter circuit, the gate driver circuits receiving voltage from the auxiliary power supply, wherein the gate driver circuits are normally-off type circuits that are provided with a capacitor for sustaining the voltage from the auxiliary power supply.

18. A converter circuit according to claim 16, wherein the normally-on switches are normally-on JFETs.

19. A converter circuit according to claim 17, wherein the normally-on switches are normally-on JFETs.

* * * * *